US00RE42198E

(19) United States
(12) Reissued Patent
LePage et al.

(10) Patent Number: US RE42,198 E
(45) Date of Reissued Patent: Mar. 8, 2011

(54) ROLL-UP DOOR FOR VEHICLE SHELTERS

(75) Inventors: Robert LePage, Bois-des-Fillon (CA); Michel Paradis, Laval (CA)

(73) Assignee: Rite-Hite Holding Corporation, Milwaukee, WI (US)

(21) Appl. No.: 09/205,318

(22) Filed: Dec. 3, 1998

Related U.S. Patent Documents

Reissue of:
(64) Patent No.: 5,579,820
Issued: Dec. 3, 1996
Appl. No.: 08/339,175
Filed: Nov. 10, 1994

(51) Int. Cl.
*A47G 5/02* (2006.01)

(52) U.S. Cl. ..... 160/268.1; 160/271; 160/323.1; 160/273.1

(58) Field of Classification Search ..... 160/271, 160/273.1, 268.1, 370.22, 323.1, 264; 135/117
See application file for complete search history.

(56) References Cited

U.S. PATENT DOCUMENTS

| | | | | |
|---|---|---|---|---|
| 1,033,224 A | | 7/1912 | Andlauer | |
| 2,594,910 A | * | 4/1952 | Germann | 160/271 X |
| 2,886,104 A | * | 5/1959 | Swan | |
| 3,051,232 A | * | 8/1962 | Lamb | 160/273.1 X |
| 3,460,602 A | * | 8/1969 | Hugus | |
| 3,463,174 A | * | 8/1969 | Heller | |
| 3,749,107 A | * | 7/1973 | Laberge | |
| 3,878,879 A | | 4/1975 | Mannes | |
| 4,016,920 A | | 4/1977 | Shepard | |
| 4,150,682 A | * | 4/1979 | Ryce | |
| 4,231,289 A | * | 11/1980 | Domicent | 135/117 X |
| 4,452,292 A | | 6/1984 | Leivenzon et al. | |
| 4,478,268 A | | 10/1984 | Palmer | |
| 4,495,736 A | * | 1/1985 | Lamontagne | |
| 4,569,383 A | | 2/1986 | Wentzel | |

(Continued)

FOREIGN PATENT DOCUMENTS

| | | | |
|---|---|---|---|
| BE | 533251 | * 11/1954 | |
| DE | 3841139 | * 6/1990 | 160/238 |
| EP | 125217 | 11/1984 | |
| FR | 1009862 | 6/1952 | |
| GB | 240349 | 10/1925 | |
| GB | 503774 | 4/1939 | |
| GB | 1444017 | 4/1972 | |

OTHER PUBLICATIONS

"Re–Coil Away Specifications"; M & I Door Systems Limited; Date unknown; 2 pages.

(Continued)

*Primary Examiner*—Blair M. Johnson
(74) *Attorney, Agent, or Firm*—Hanley, Flight & Zimmerman, LLC

(57) ABSTRACT

A roll-up closure device for typically collapsible vehicle shelters of the type having a structure made of assembled tubular members and cross-members and a complementary covering therefor made of a flexible plastics material and defining at the front end thereof a door opening. The side walls of the shelter are inclined in such a way as to diverge from top to bottom, whereby the door opening has generally a isosceles trapezoidal shape. The device includes a pair of opposed side guide rails mounted at laterally opposite sides of the door opening so as to follow the angled sides thereof, an overhead motor driven roll-up boom extending above the door opening, and a flexible closure shaped like the door opening and having its lateral side edges slidably engaged in the guide rails, whereby the closure device does not substantially reduce the lateral dimensions of the door opening. Cables attached to the roll-up boom are secured to the lateral edges of the closure so that the rotation of the boom causes the cables to wind around respective tapered pulleys provided near each end of the boom with the closure in a rolled attitude extending between the pulleys. Stretched elastics are secured to the lower part of the closure to laterally retract the side edges of the latter towards each other as the closure is being raised. A tensioning mechanism is provided to ensure that the cables remain taut at any position of the closure.

27 Claims, 5 Drawing Sheets

U.S. PATENT DOCUMENTS

| | | | | | |
|---|---|---|---|---|---|
| 4,601,320 | A | | 7/1986 | Taylor | |
| 4,800,946 | A | | 1/1989 | Rosenoy | |
| 4,884,617 | A | | 12/1989 | Coenraets | |
| 4,887,627 | A | * | 12/1989 | Audet | |
| 4,887,660 | A | | 12/1989 | Kraus | |
| 4,896,714 | A | | 1/1990 | Ellis | |
| 4,979,775 | A | * | 12/1990 | Klose | 160/370.22 X |
| 5,025,847 | A | | 6/1991 | Mueller | |
| 5,042,556 | A | * | 8/1991 | Ruiter | |
| 5,048,588 | A | | 9/1991 | Weishar et al. | |
| 5,056,579 | A | | 10/1991 | Krafutler | |
| 5,078,197 | A | | 1/1992 | Weishar | |
| 5,123,474 | A | | 6/1992 | Smith | |
| 5,139,074 | A | | 8/1992 | Warner | |
| 5,139,075 | A | | 8/1992 | Desrochers | |
| 5,141,043 | A | | 8/1992 | Kraeutler | |
| 5,141,044 | A | | 8/1992 | Hying et al. | |
| 5,163,495 | A | * | 11/1992 | Lichy | |
| 5,201,810 | A | * | 4/1993 | Ojima et al. | 160/370.22 X |
| 5,207,256 | A | | 5/1993 | Kraeutler | |
| 5,222,541 | A | | 6/1993 | Hornberger | |
| 5,271,448 | A | | 12/1993 | Delgado | |
| 5,299,617 | A | | 4/1994 | Hying et al. | |
| 5,353,859 | A | | 10/1994 | Oltahfer et al. | |
| 5,477,902 | A | | 12/1995 | Kraeutler | |
| 5,526,865 | A | | 6/1996 | Coenraets | |
| 5,535,805 | A | | 7/1996 | Kellogg et al. | |
| 5,601,133 | A | | 2/1997 | Krupke et al. | |
| 5,638,883 | A | | 6/1997 | Schulte | |

OTHER PUBLICATIONS

"Re–Coil–Away Door System Installation Instructions"; M & I Door Systems, Ltd.; May 1991; 18 pages.

"M & I Door Systems Limited" Product Brochure; M & I Door Systems Limited; Date unknown; 4 pages.

"Rytec Breaks Away!" Products Brochures; Rytec Corporation; 1991; 2 pages.

"Rapid Roll Doors: The Super–Fast Solution!" Products Brochure; Albany International; 1990; 8 pages.

"Marathon Spirit" Products Brochure; Marathon Door Division—ASI Technologies; 1991; 3 pages.

"RT Series" Product Brochure; Kelley Company, Inc. 1993; 2 pages.

"Kelley Door Selection Guide"; Kelley Company, Inc.; 1993; 16 pages.

"Speedor" Product Brochure; Hart; Date unknown; 1 page.

* cited by examiner

ROLL-UP DOOR FOR VEHICLE SHELTERS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to collapsible vehicle shelters such as those having a structure made of assembled tubular members and cross-members and a complementary covering therefor made of a flexible plastic material and, more particularly, to a roll-up door for the door opening defined at the front of such vehicle shelters.

2. Description of the Prior Art

The present invention relates to roll-up closures for use in collapsible automobile shelters of the type illustrated in U.S. Pat. No. 4,887,627 issued on Dec. 19, 1989 to Audet. Audet discloses an improved collapsible shelter comprising a structure made up of tubular members and cross-members forming an assembly having side walls diverging from top to bottom and a roof section with the structure being covered by a covering complementary in shape to the assembled structure and made up of a weather proof flexible plastic material. At the front of the shelter, there is defined an opening which, in the Audet patent, is rectangular and is closed by curtain-type flexible plastic sheet doors provided on one or two sides of the opening. The opening is obviously intended for allowing the vehicle to access the shelter.

In other shelters, the front opening extends the whole width of the shelter, that is from side wall to side wall of the assembled structure, thereby having the shape of an isosceles trapezoid. Such openings are practical as they are as large as the shelter itself. However, it is difficult to adapt any closure to such a trapezoid-shaped opening and, to this date, roll-up curtain-type flexible closures have been used therefor with these closures being manually rolled-up from one side of the assembled structure laterally towards the other side thereof, whereat they are retained by strings.

Also known is a rectangular closure made of the same flexible material as the vehicle shelter itself which by way of cables and pulleys can be manually raised, in a way more or less similar to horizontal Venetian blinds, towards its retracted position. A number of spaced apart horizontally extending elongated rigid members are fixed to the closure so that the closure includes three sections which fold substantially like conventional garage doors. The sides of the closure are guided in a pair of parallel vertical rigid frame members.

U.S. Pat. No. 4,495,736 issued on Jan. 29, 1985 to Lamontagne discloses a vehicle shelter intended to house the front engine compartment of the automobile. This shelter includes a flexible canvas which surrounds the engine compartment substantially up to the windshield of the vehicle. Warm air is blown under the engine compartment so as to warm not only the crank-case but also the battery and other parts situated therein. The shelter is provided with a vertically rolled-up conventional and rudimentary closure 9. U.S. Pat. No. 4,150,682 issued on Apr. 24, 1979 to Ryce discloses a vehicle shelter comprising a closet-type enclosure with doors which contains a plurality of arched hoops having ground engaging skids and with a flexible covering being attached to these arched hoops. In storage, the hoops and the covering are retracted into the enclosure. The hoops may be pulled out manually from the enclosure and over a car parked in front thereof. The shelter itself does not actually include any flexible door for access thereto, when expanded.

U.S. Pat. No. 5,123,474 issued on Jun. 23, 1992 to Smith discloses a roll-up closure device made of a flexible material which is rolled-up on a motor driven tubular cylindrical drum journalled at the ends thereof on bearings. The closure is guided in vertical tracks which define therebetween a rectangular opening with the closure being of rectangular complementary shape.

U.S. Pat. No. 5,042,556 issued on Aug. 27, 1991 to Ruiter discloses a door assembly for a rectangular doorway opening, such as a garage opening, which comprises a flexible door panel which is guided around rotatable guide wheels between a vertical closed position and a horizontal open position.

U.S. Pat. No. 3,878,879 issued on Apr. 22, 1975 to Manns discloses a roll-up door having a flexible door-leaf arranged to be wound about a roller for closing and opening the rectangular door with trolleys running in guide rails being located at the vertical side frames for maintaining the door-leaf in a laterally stretch condition, and with a movable pulley loaded by a weight being provided for maintaining the door-leaf in a vertically stretched position.

U.S. Pat. No. 5,163,495 issued on Nov. 17, 1992 to Lichy discloses a closure assembly for closing a rectangular opening which comprises a pair of vertical guides and a closure member engaged in the guides so that the closure member can slide along the guides. The closure member includes a pair of vertical tape-shaped tracking members disposed on opposite edges thereof and which are retained within the guides. A biasing assembly which enhances lateral tension on the closure member is also suggested.

U.S. Pat. No. 3,749,107 issued on Jul. 31, 1973 to Laberge discloses a collapsible shelter which comprises a plurality of upstanding parallel spaced apart arched members, the lower ends of which being received in a pair of channels fixed to the ground. A flexible covering is spread over the arched members with the lower edges of this covering being held by the channels.

U.S. Pat. No. 3,463,174 issued on Aug. 26, 1969 to Heller discloses a portable cover structure for a vehicle, wherein foldable frame sections have curtain tracks attached thereto, the frame sections being pivotally hinged so as to form, when expanded, a continuous covered level frame defining an uninterrupted curtain track which receives a curtain for completely enclosing the level frame.

U.S. Pat. No. 2,886,104 issued on May 12, 1959 to Swan discloses an awning of rectangular shape which can be displaced between an inoperative retracted position and an operative extended position wherein, when extended, the awning will provide a roof enclosure having its fabric maintained in a taut condition.

U.S. Pat. No. 3,460,602 issued on Aug. 12, 1969 to Hugus discloses a tensioning device for a rectangular flexible roll-up closure, wherein the flexible closure membrane is fastened to a bottom rail which is displaceable relative to an upper roller around which the membrane can be wound and unwound as the closure opens and closes. Tension is applied to the flexible closure membrane by way of a spring and cable system which biases the bottom rail away from the upper roller. The membrane is guided along a pair of vertical trackways.

SUMMARY OF THE INVENTION

It is therefore an aim of the present invention to provide an improved closure device for vehicle shelters.

It is also an aim of the present invention to provide an improved roll-up closure device adapted to close a shelter door opening having a tapered shape and, more particularly, an isosceles trapezoidal shape, wherein the parallel sides of the trapezoid correspond to the horizontal sides of the door opening, with the door being wound in an horizontal position at the top of the door opening.

It is a further aim of the present invention to provide a roll-up closure device for vehicle shelters which is driven by a reversible motor which can also preferably be actuated from a remote location.

It is a still further aim of the present invention to provide a roll-up closure device for vehicle shelters wherein the flexible closure or door includes laterally inward biasing means for maintaining the flexible closure taut during the opening and closing thereof, and for allowing the flexible closure to somewhat yield depth-wise.

Therefore, in accordance with the present invention, there is provided a roll-up closure device typically for use on vehicle shelters of the type defining at a front end thereof a door opening having lateral sides which diverge from top to bottom, comprising a pair of guide means adapted to be mounted to the vehicle shelter substantially at the lateral sides of the door opening and substantially parallel thereto, an overhead roller means adapted to be rotatably mounted inside the vehicle shelter and substantially horizontally above the door opening, a flexible closure means adapted to be secured at a top end thereof to said roller means, at least a section of said flexible closure having a shape substantially complementary to that of the door opening and including diverging lateral side edges adapted to be engaged in said guide means, whereby a rotation of said roller means causes said flexible closure to displace along said guide means and to wind around said roller means or to unwind therefrom for displacing said flexible closure towards an open or a closed position thereof, respectively.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
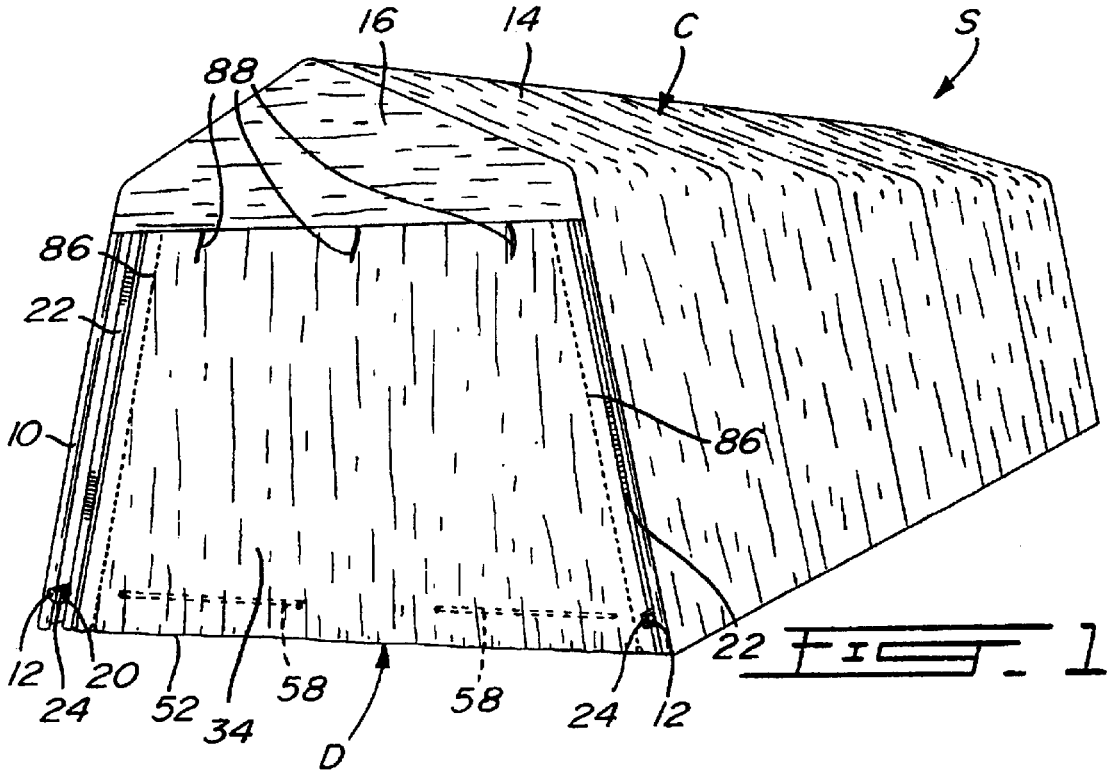
FIG. 1 is a perspective view of a collapsible shelter for vehicles adapted with a roll-up closure device in accordance with the present invention, the closure device being shown in a closed position thereof.
Figure 9:
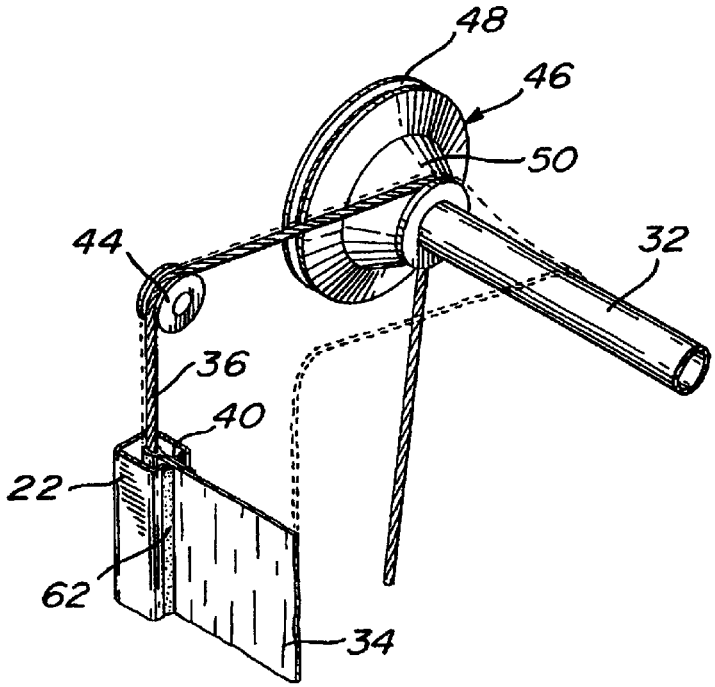
FIG. 9 is a perspective view of part of the roll-up closure device of the present invention.
Figure 3:
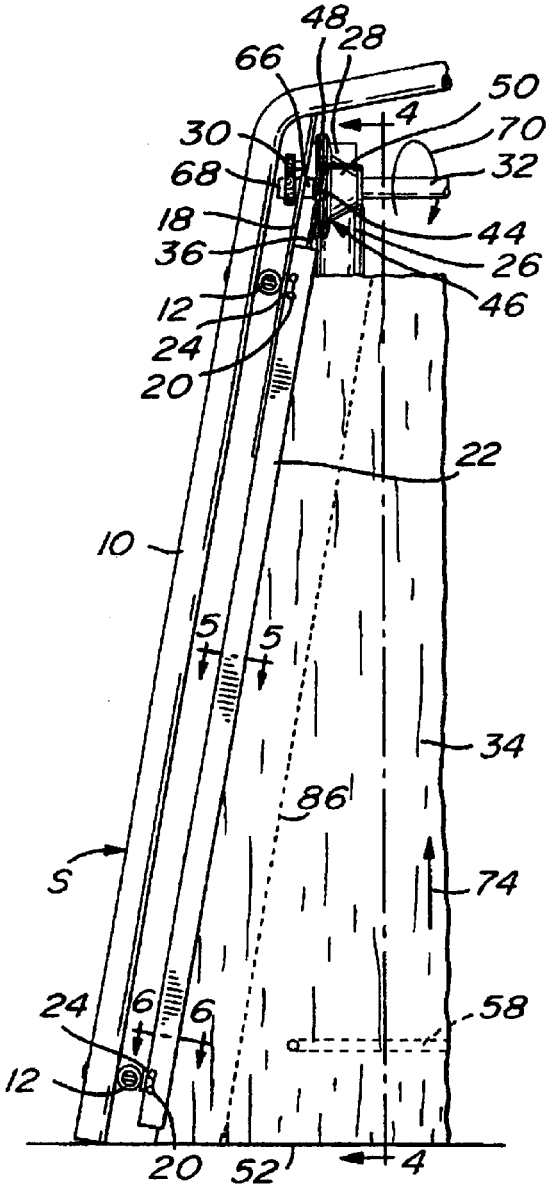
FIG. 3 is a partly broken way front elevational view of the left hand part of the shelter and the roll-up closure device of FIG. 1.
Figure 7:
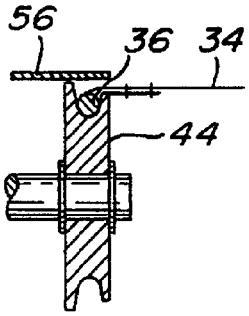
FIG. 7 is a cross-sectional view taken along line 7—7 of FIG. 4.
Figure 4:
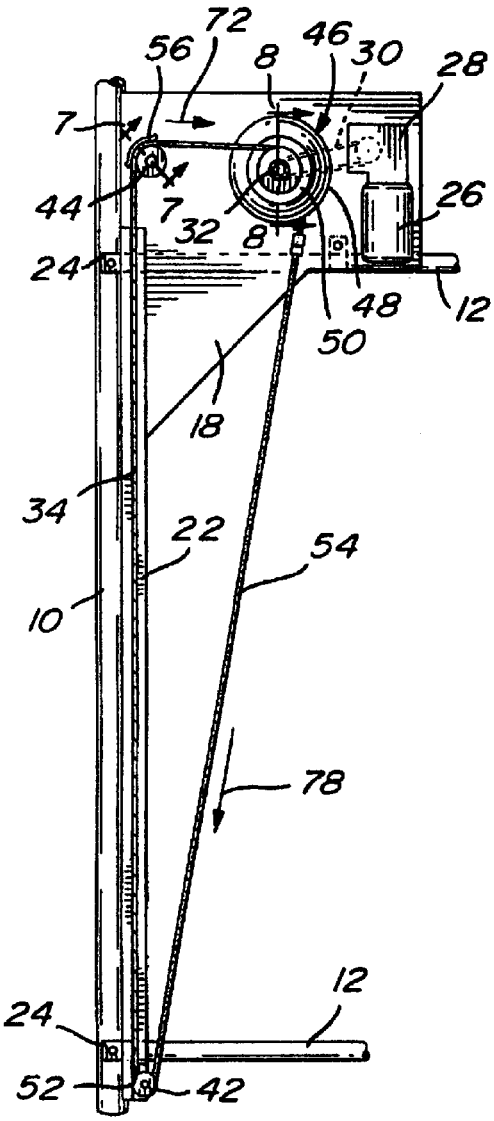
FIG. 4 is a cross-sectional side elevational view taken along line 4—4 of FIG. 3.
Figure 12:
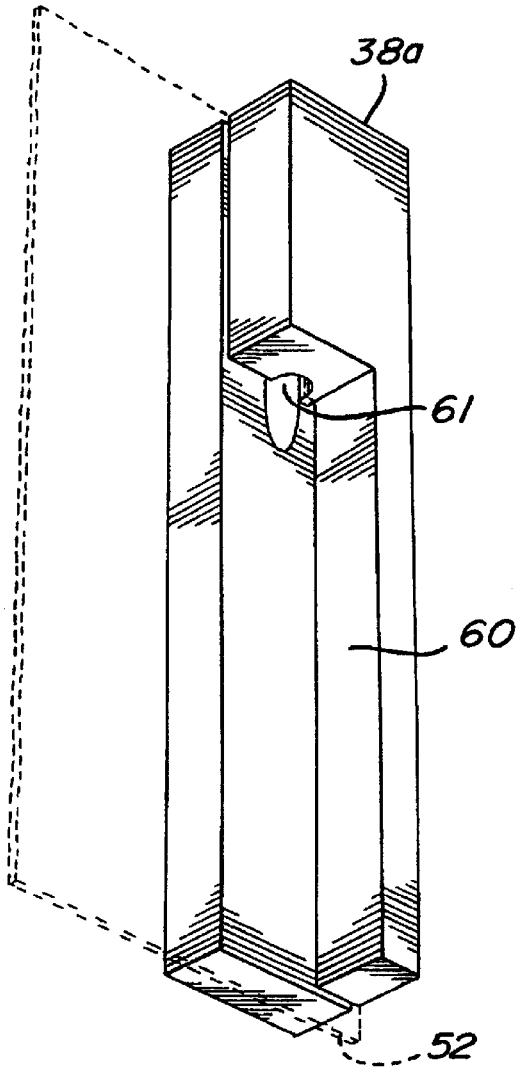
FIG. 12 is a perspective view of a detail of the variant of FIG. 11.

FIG. 1 illustrates a conventional vehicle shelter S adapted with a closure device D in accordance with the present invention, wherein the vehicle shelter S comprises a supporting structure made up of a series of vertically and transversely oriented, spaced apart and parallel, arched members 10 which are connected one to the other by longitudinal cross-members 12 (see FIG. 13), with a covering C being installed around the structure and being attached to the various arched members 10 and cross-members 12. The covering C which is made of a flexible plastic sheet material comprises a roof section 14 wrapped around the arched members 10, and a vertical front section 16 located above the door opening defined in the shelter S for providing access for a vehicle to the inside of the shelter S. The closure device D of the present invention is intended to selectively open or close the door opening of the shelter S. As best seen in FIGS. 1 and 12, the shelter door opening has the shape of an isosceles trapezoid- The closure device D of the present invention is of the roll-up type and includes a pair of support plate 18 adapted to be fixedly mounted to the structure of the shelter S and, as best seen in FIG. 3, to an upper cross-member 12 thereof by way of a bolt and wing nut assembly 20 of the type already provided in the conventional shelter S for securing the cross-members 12 to the arched members 10. A guide rail 22 is secured to each one of the support plates 18 and extends therefrom in a downwardly and slightly inclined way in such a way as to follow the sides of the trapezoidal door opening- The lower end of each guide rail 22 is secured to a respective lower one of the cross-members 12 again using the bolt and wing nut assembly 20. As seen in FIG. 4, brackets 24 are provided on the support plates 18 and on the guide rails 22 for use with the bolt and wing nut assemblies 20 to secure the closure device D to the shelter S.

Each support plate 18 is provided with a pulley system and a cable system which will be described in details hereinafter. Only one of the support plates 18 and, more particularly, the left one in the drawings is provided with a motor 26 coupled to a reducer gearbox 28 which drives by way of a toothed belt 30 a shaft 32 which extends transversely above the door opening and which is journalled at its ends to the support plates 18. Asides from the motor 26, the reducer gearbox 28 and the toothed belt 30, the equipment provided on each of the support plates 18 is identical.

Figure 5:
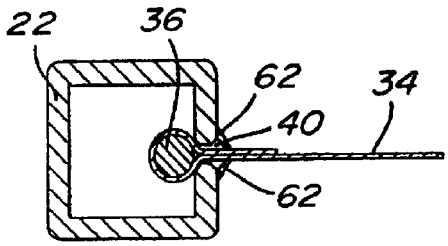
FIG. 5 is a cross-sectional view taken along line 5—5 of FIG. 3.
Figure 2:
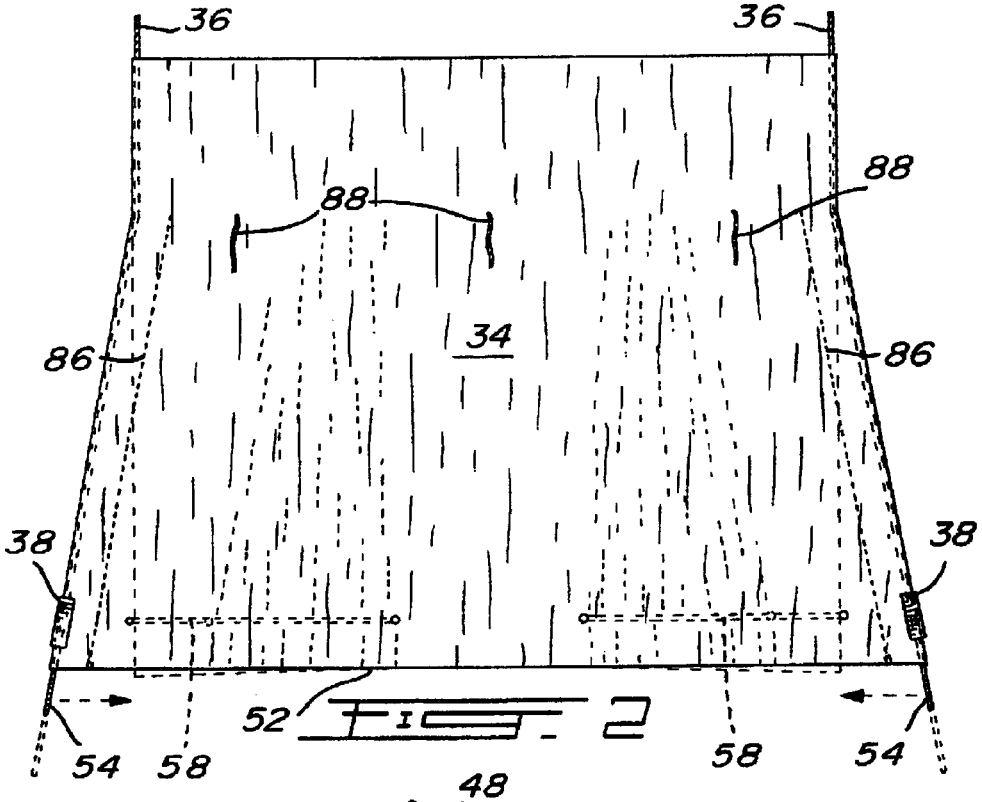
FIG. 2 is a front elevational view of part of the closure device of FIG. 1 and, more particularly, of a flexible closure thereof and the cables running therethrough.

A flexible closure 34 made of a plastic sheet material which is well illustrated in FIG. 2 is adapted to engage at the sides thereof the guide rails 22 for displacement therealong so that the closure 34 is either wound around the shaft 32 or is unwound therefrom depending on the rotation of the motor 26. As best seen in FIGS. 2 and 5, the closure 34 defines a loop at each side thereof with a cable 36 extending through this loop. As seen in FIG. 2, the closure 34 includes an upper straight section intended to extend above the door opening and to be attached to the shaft 32 and a lower flared section adapted to follow the shape of the door opening so that, when the closure 34 is closed as in FIG. 1, the closure 34 completely closes off the trapezoidal door opening defined at the front end of the shelter S- A Teflon™ block 38 is fixedly secured near the bottom end of each side of the closure 34 for reasons which will be explained in details hereinafter.

The side edges of the closure 34 and, more particularly, the loops thereof enclosing the cables 36 and the lower blocks 38 enclosing both the closure loops and the cables 36 are received into the guide rails 22 which each define an inwardly facing longitudinal slot 40 for allowing the closure 34 to extend through the guide rails 22, inwardly from the cables 36. As seen in FIG. 4, there is rotatably mounted a lower pulley 42 at the bottom ends of each guide rail 22.

Figure 13:
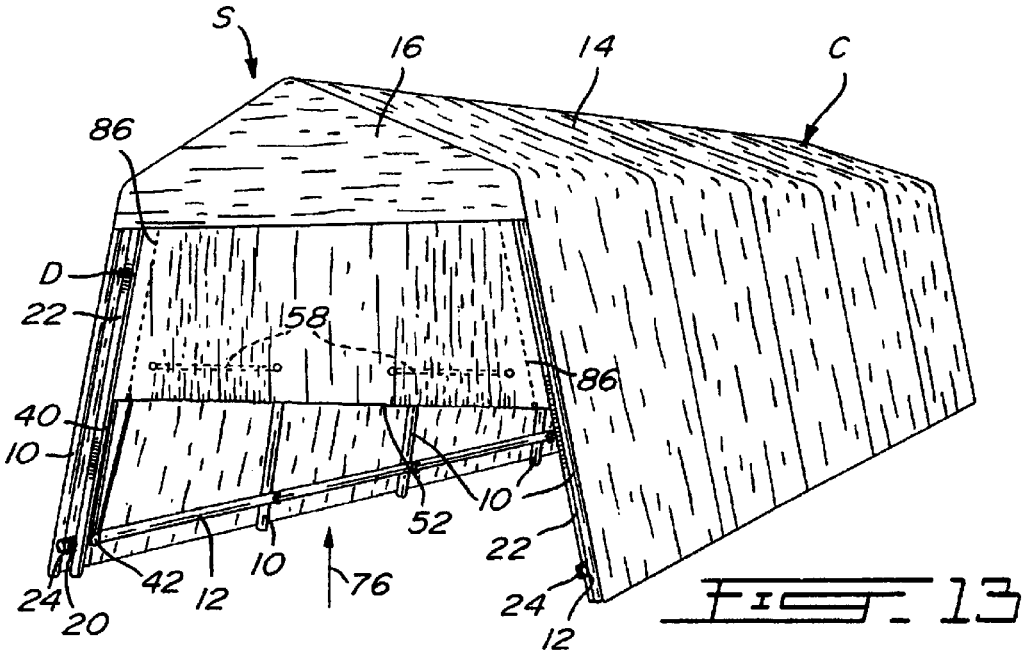
FIG. 13 is a perspective view of the vehicle shelter and of the roll-up closure device of the present invention, similar to FIG. 1, but showing the roll-up closure device in a half open position and adapted with the variant of FIGS. 11 and 12.

As best seen in FIGS. 2, 4 and 13, each support plate 18 comprises a pulley system which includes a front guide pulley 44 and a double pulley 46 which comprises a slightly outwardly angled outer pulley 48 and a frusto-conical inner pulley 50. The cable 36 is fixedly attached at both ends thereof to the double pulley 46 and, more particularly, one end of the cable 36 is attached to the outer pulley 48 with the other end thereof being attached to the inner pulley 50. From the inner pulley 50, the cable 36 passes around the guide pulley 44 and then runs along the lateral edge of the closure 34 while, as mentioned hereinabove, being secured thereto. At the bottom of the closure 34, the cable 36 extends through the Teflon™ block 38 which is mounted to the lower end of the closure 34. The cable 36 then engages the lower pulley 42 rotatably mounted at the lower end of the guide rail 22. Afterwards, the cable 36 extends upwards, behind the closure 34 and is then secured to the outer pulley 48. Between the lower pulley 42 and the outer pulley 48, at least part of the cable 36 includes an elastic section 54 which acts as a binder for reasons which will be explained hereinafter.

A retaining arm 56 is mounted slightly above the guide pulley 44 for ensuring the engagement of the cable 36 with the guide pulley 44, as best seen in FIG. 4.

As seen in FIGS. 1 and 2, the lower end of the closure 34 comprises a pair of horizontal elastic members 58 which ensure that the closure 34 remains relatively taut at the point of entry thereof in the guide rails 22 when the closure 34 is displaced upwards and gradually becomes "too big" in view of the converging side guide rails 22. Indeed, as the closure 34 gradually moves upwards, the elastic members 58 pick up the slack produced in the closure 34. The teflon™ blocks 38 are located opposite the elastic members 58 in order to ensure that, even with the elastic force applied inwardly by the elastic members 58, the closure 34 and the cables 36 connected thereto can slide along the guide rails 22.

Figure 11:
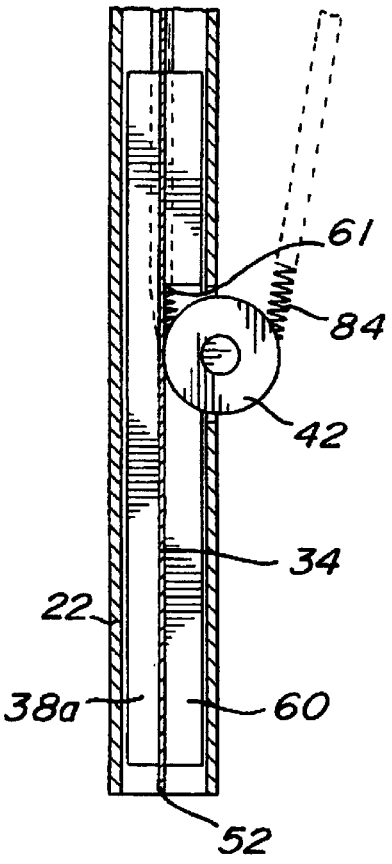
FIG. 11 is a vertical cross-sectional side view of part of the roll-up closure device.

As seen in FIGS. 11 and 12, a variant 38a of the teflon™ block 38 defines an inner lower recess 60 which communicates with a vertical opening 61 for allowing the cable 36 to leave the closure 34 higher than a lower edge 52 thereof. This configuration allows for the lower pulleys 42 to be mounted above the ground surface (as seen in FIG. 13) thereby reducing the possibility that they become jammed because of the ice built-ups on or near the ground. Opposite the recess 60, the closure 34 is thus not directly driven by the cable 36, but the rigidity of the block 38a ensures that the lower end 52 of the closure 34 located opposite the recesses 60 of the teflon™ blocks 38a extends firmly downwardly right up to the ground so that the closure 34 properly closes the door opening of the shelter S along the whole height thereof and, more particularly, at the lower end 52 of the closure 34 as it is not driven by the cables 36. Therefore, the configuration of the teflon™ blocks 38a allow for the lower pulleys 42 to be mounted considerably above the ground to prevent the same from jamming due to ice built-ups, while ensuring that the closure 34 extends vertically and firmly downwards right up to the ground.

Figure 6:
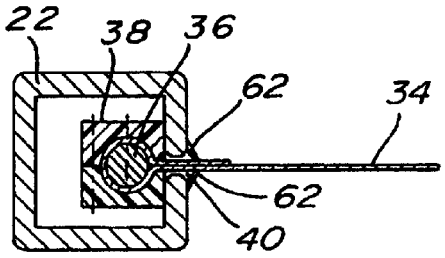
FIG. 6 is a cross-sectional view taken along line 6—6 of FIG. 3.

As seen in FIGS. 5 and 6, the guide rails 22 are provided with seals 62 inwardly of the slots 40 thereof.

Figure 10:
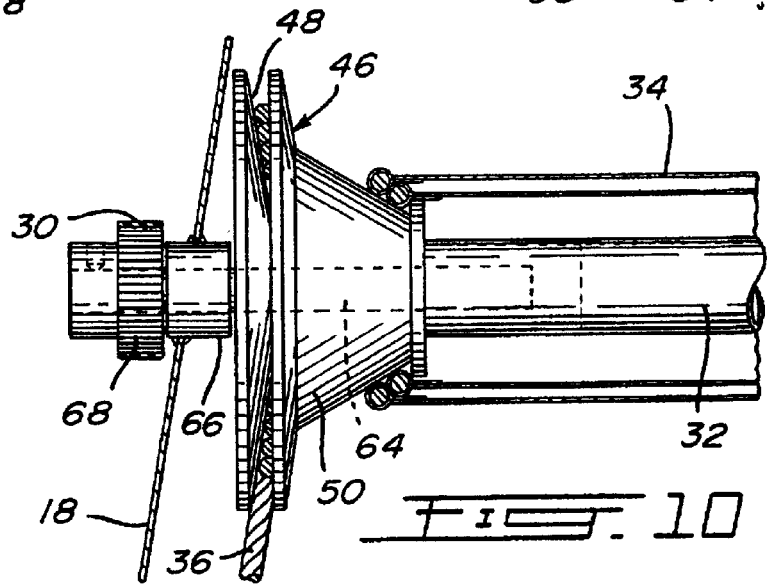
FIG. 10 is a longitudinal vertical cross-sectional view of part of the roll-up closure device.
Figure 8:
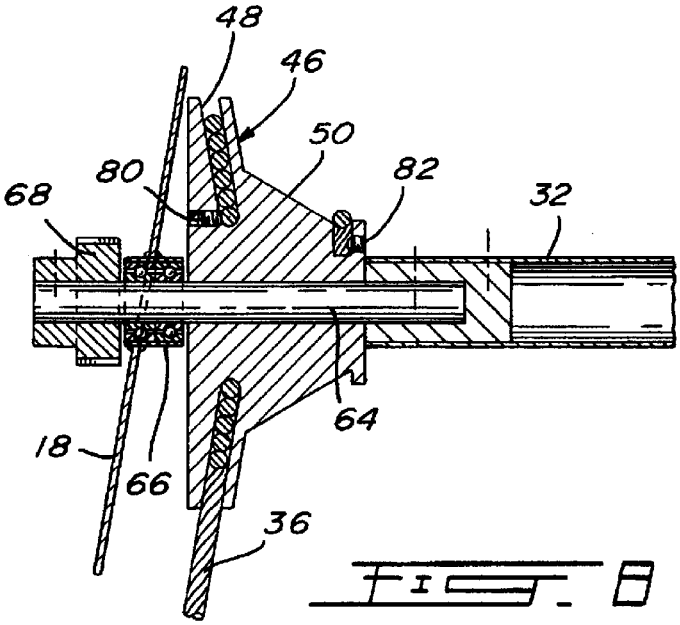
FIG. 8 is a cross-sectional view taken along line 8—8 of FIG. 4.

As seen in FIGS. 8 and 10, the overhead shaft 32 does not extend through the double pulleys 46, but rather includes an extension 64 of small diameter which extends outwardly therefrom and through the double pulley 46. The shaft extension 64 then extends outwardly through bearings 66 secured to the support plate 18 and, outwardly of the support plate 18, the shaft extension 64 is fixedly received in a square-toothed gear 68 (e.g. a timing gear), the teeth of the toothed belt 30 being engaged between the teeth of the timing gear 68 for drivingly connecting the motor 26 and reducer gearbox 28 to this timing gear 68.

With reference to FIGS. 3, 4 and 8, it is understood that, when the closure 34 is closed, an appropriate rotation of the motor 26 causes a rotation of the shaft 32 along arrow 70 of FIG. 3 thereby causing the cables 36 to displace along arrow 72 of FIG. 4, whereby the cables 36 gradually wind around the inner pulleys 50 while the closure 34 is being raised along the guide rails 22 along arrow 74 of FIG. 3 and arrow 76 of FIG. 13, the lateral edges of the closure 34 which enclose the cables 36 gradually winding around the inner pulleys 50 (see FIG. 10) while the cables 36 simultaneously unwind from the outer pulleys 48 along arrow 78 of FIG. 4. As the closure 34 is being raised, the effective width thereof increases but, in view of the tapered configuration of the inner pulleys 50 (again see FIG. 10), the closure 34 will wind around the shaft 32 while remaining substantially taut in view of the outward stacking of the cables 36 onto the inner pulleys 50. The outer pulleys 48 are slightly angled to facilitate the unwinding and winding of the cables 36 therearound in view of the angular orientation of the cables 36 below the outer pulleys 48, as seen in FIG. 8. Furthermore, the tapered configuration of the inner pulleys 50 ensures that the closure 34 winds there around in an orderly fashion, as seen in FIG. 10. As seen in FIG. 3, the cable 36 is directed by the guide pulley 44 towards the larger outward end of the tapering inner pulley 50 so that the cable 36 can then appropriately slide downwards and inwards from this outward end of the inner pulley 50 towards the inward smaller end thereof, thereby ensuring a neat and orderly stacking of the coils of the cable 36 around the inner pulley 50.

The elastic portion 54 of each cable 36 acts as a binder to ensure that the cables 36 remain taut during the operation of the closure 34 in view of the fact that, during rotation of the double pulleys 46, the amount of cable which is being wound around one of the outer and inner pulleys 48 and 50 thereof is normally different from the amount of cable which unreels from the other one of the outer and inner pulleys 48 and 50, respectively.

Even though there are elastic portions 54 in the mechanism for driving the closure 34 between the open and closed positions thereof, the motor 26 acts directly on the closure 34 during the ascension thereof, i.e. its displacement towards its open position, as it is the unextendable cables 36 which act on the closure 34, the binder mechanism provided by the elastic portion 54 being only functional during the lowering of the closure 34. This configuration allows the motor 26 to exert direct forces on the closure when it is being opened thereby enabling the motor 26 to dislodge the lower end of the closure 34, for instance, from ice having built up thereat while the closure 34 was closed.

Alternatively, the elastic portions 54 can be replaced by springs 84, as seen in FIG. 11, which might have a more constant spring force for the various operating temperatures of the closure device D.

The elastic members 58 again will ensure that the slack gradually provided in the closure 34 when it is raised is taken up substantially centrally of the closure 34 and not at the lateral edges thereof in order to ensure a proper sliding action of the closure 34 along the guide rails 22, that is to prevent a jamming of the lateral edges of the closure 34 in the slots 40 of the guide rails 22.

A reverse operation of the motor 26 causes the cables 36 to wind around the outer pulleys 48 of the double pulleys 46, whereby the closure 34 is pulled downwards along the guide rails 22 and thus unwinds gradually from the inner tapered pulleys 50 of the double pulleys 46.

As well known in the art of garage doors, a remote control can be provided for remotely operating the motor 26 thereby allowing the user to open and close the closer 34 at a distance and, for instance, from within a vehicle.

When the closure 34 is closed, the elastic members 58 can still be somewhat extended in order to allow for the closure 34 to sufficiently yield when a force is applied thereon, such as by snow being thrown thereon by a snowplow or the like, thereby preventing rupture of the closure 34.

As seen in FIG. 8, the ends of the cables 36 are secured to the outer pulleys 48 by screws 80 and to the inner pulleys 50 by screws 82.

For manual opening and closing of the closure 34 in case of a failure of the motor 26 or in case of the closure 34 becoming jammed in the guide rails 22 due to ice, there are provided a pair of side zippers 86 (see FIGS. 1 and 2) which extend parallel to and slightly inwards of the guide rails 22, whereby the closure can be manually rolled and then attached at the top of the door opening with strings 88.

Accordingly, by way of the closure device D of the present invention, a flared door opening defined in a vehicle shelter C can be completely closed in a substantially taut way and, when the closure is being raised or generally when it is at least partly wound around the overhead shaft, the closure is wound in an orderly and taut fashion around this overhead shaft. The closure device of the present invention thus allows for a motorized closure to be installed on a vehicle shelter without reducing the effective width of the door opening thereof.

We claim:

1. A roll-up closure device typically for use on vehicle shelters of the type defining at a front end thereof a door opening having lateral sides which diverge from top to bottom, comprising a pair of guide means adapted to be mounted to the vehicle shelter substantially at the lateral sides of the door opening and substantially parallel thereto thereby diverging from top to bottom an overhead roller means adapted to be rotatably mounted inside the vehicle shelter and substantially horizontally adjacent an upper end of the door opening, a flexible closure means adapted to be secured at a top end thereof to said roller means, at least a section of said flexible closure means having a shape which tapes in direction of said roller means and including diverging lateral side edges adapted to be engaged in said guide means, whereby a rotation of said roller means causes said flexible closure means to displace along said guide means and to wind around said roller means or to unwind therefrom for displacing said flexible closure means towards an open or a closed position thereof, respectively, wherein in said closed position, said section of said flexible closure means substantially completely closes the door opening.

2. A closure device as defined in claim 1, wherein said roller means comprise winding means adapted to take up substantially triangular lateral end portions of said section such that when said flexible close means is in a rolled attitude around said roller means, said flexible closure means defines substantially concentric and cylindrical layers of varying axial width.

3. A close device as defined in claim 2, wherein said roller means comprise a rotatable shaft with said up end of said flexible closure means being attached thereto, a pair of pulley means mounted at ends of said shaft, cable means being engaged to said pulley means and secured to said flexible closure means such that a rotation of said shaft and pulley means cause said cable means to displace thereby displacing said flexible closure means.

4. A closure device as defined in claim 3, wherein each said pulley means comprise first pulley having an outwardly flaring bottom for receiving said lateral side edicts of said flexible closure means in an axially outwardly staggered relationship therearound for maintaining substantially taut said cylindrical layers of said section in said rolled attitude.

5. A closure device as defined in claim 4, wherein said cable means are connected to said pulley means such as to define closed loops, each said pulley means comprising a second pulley adjacent said first pulley, each said cable means being secured to both said first and second pulley such that a rotation of said pulley means causes said cable means to wind around one of said first and second pulleys and to unwind from another one of said first and second pulleys.

6. A closure device as defined in claim 4, wherein said first pulley is frusto-conical shaped.

7. A closure device as defined in claim 5, wherein a third pulley engaged by said cable means is provided at a lower end of each said guide means, whereby when said flexible closure means is displaced towards said closed position thereof, said flexible closure means and said cable means attached thereto unwind from said first pulleys with said cable means being also wound around said second pulleys while driving said flexible closure means downwardly along said guide means such as to substantially completely close the door opening; whereas when said flexible closure means is displaced towards said open position thereof, said flexible closure means and said cable means attached thereto wind around said first pulleys while upwardly pulling said flexible closure means along said guide means with said cable means being also unwound from said second pulleys.

8. A closure device as defined in claim 5, wherein said second pulleys are slightly angled outwardly towards said guide means for cleanly receiving said cable means therein during rotation of said roller means towards said closed position.

9. A closure device as defined in claim 5, wherein said cable means are each provided with binding means to ensure sufficient tension therein during rotation of said roller means.

10. A closure device as defined in claim 1, wherein said flexible closure means is provided with elastic means extending substantially laterally at least adjacent said side edges to ensure that said flexible closure means remains substantially taut during rotation of said roller means.

11. A closure device as defined in claim 10, wherein said guide means each comprise a tubular member adapted to be mounted to the lateral sides defining the door opening of the vehicle shelter and inwardly defining a longitudinal slot, said lateral side edges of said flexible closure means being engaged in said tubular members and inwardly extending therefrom through said slots, said elastic means maintaining said side edges substantially taut at said slots.

12. A closure device as defined in claim 11, wherein each said guide means comprise sealing means mounted to said tubular member at said slot and at least on one side of said lateral side edges of said flexible closure means.

13. A closure device as defined in claim 1, wherein reversible motor means are provided for driving said roller means.

14. A closure device as defined in claim 1, wherein first detachable fastening means are provided on said flexible closure means inwardly of each said lateral side edge thereof for allowing said flexible closure means to be manually opened in the event that said roller means cannot be rotated or that said flexible closure means is jammed to said guide means.

15. A closure device as defined in claim 14, wherein second detachable fastening means are provided for securing said flexible closure means in an open position when having been manually opened using said first detachable fastening means.

16. A closure device as defined in claim 15, wherein said first detachable fastening means comprise zippers, and wherein said second detachable fastening means comprise strap means.

17. A closure device as defined in claim 1, wherein said flexible closure means extends substantially planarly across the door opening when in said closed position.

18. A closure device as defined in claim 11, wherein said lateral side edges of said flexible closure means are each secured opposite said elastic means to a sliding block means engaged in said tubular member for ensuring that said flexible closure means can displace along said guide means even with forces applied inwardly on said lateral side edges by said elastic members.

19. A closure device as defined in claim 18, wherein each said sliding block means comprises a pulley engaged by said cable means and mounted at a distance a lower end of said sliding block means, a lower end of said lateral side edge of said flexible closure means being mounted to said lower end of said sliding block means, said lower end of said sliding block means being adapted to extend in said guide means at least close to the ground in said closed position such that a lower edge of said flexible closure means extends at least close to the ground, whereby said pulley, being mounted fairly above the ground, and said cable means are not as vulnerable to jamming due to ice built-ups with said sliding block means ensuring that said flexible closure means extends firmly downwards to the ground.

*20. A roll-up closure device adapted to be disposed adjacent a door opening and movable between blocking and unblocking positions relative thereto, and comprising:*

*a roller adapted to be rotatably mountable adjacent an upper end of the door opening;*

*a curtain adapted to be secured at a top end thereof to the roller whereby rotation of the roller causes the curtain to wind or unwind from the roller to move between unblocking and blocking positions, respectively;*

*guide members adapted to be disposed at the lateral sides of the door opening;*

*guide engagement members couplable to the curtain for movement therewith and engageable with the guide members to restrict their movement toward the curtain center; and*

*a discrete elastic member coupled to the curtain for movement therewith extending laterally across the curtain, and disposed such that the elastic member can be stretched laterally between the restricted guide engagement members.*

*21. The device of claim 20, wherein opposed ends of the elastic member are coupled to the curtain, and the restricted guide engagement members are coupled to the lateral edges of the curtain, an increased lateral separation of the guide engagement members exerting a pulling force on the curtain tending to stretch the elastic member.*

*22. The device of claim 20, wherein the elastic member can be stretched to allow the curtain to yield to an applied external force without rupturing.*

*23. The device of claim 20, wherein the guide engagement members are cables extending along the lateral edge of the curtain and received in the pocket formed therein.*

*24. The device of claim 20, wherein the guide engagement members are blocks coupled to the lateral edges of the curtain at approximately the same height as the elastic member.*

*25. The device of claim 20, and including a second elastic member coupled to the curtain for movement therewith and extending laterally across the curtain such that the second elastic member can be stretched between the restricted guide engagement members.*

*26. A roll-up closure device adapted to be disposed adjacent a door opening and movable between blocking and unblocking positions relative thereto, and comprising:*

*a roller adapted to be rotatably mountable adjacent an upper end of the door opening;*

*a curtain adapted to be secured at a top end thereof to the roller whereby rotation of the roller causes the curtain to wind or unwind from the roller to move between unblocking and blocking positions, respectively;*

*guide members adapted to be disposed at lateral sides of the door opening; and*

*laterally inwardly biasing means for maintaining the curtain taut, and for allowing the curtain to yield depthwise for an applied force, wherein the laterally inwardly biasing means is moveable with the curtain between the blocking and unblocking positions.*

*27. The device of claim 26, wherein the laterally inward biasing means comprises:*

*guide engagement members couplable to lateral edges of the curtain for movement therewith and engageable with the guide members to restrict their movement toward the curtain center; and*

*a discrete elastic member coupled to the curtain for movement therewith and extending laterally across the curtain, and disposed such that the elastic member can be stretched between the restricted guide engagement members.*

* * * * *

UNITED STATES PATENT AND TRADEMARK OFFICE

CERTIFICATE OF CORRECTION

PATENT NO. : RE42,198 E
APPLICATION NO. : 09/205318
DATED : March 8, 2011
INVENTOR(S) : LePage et al.

It is certified that error appears in the above-identified patent and that said Letters Patent is hereby corrected as shown below:

Column 8, line 13 (claim 3), after "said" delete "up" and insert --top--

Column 9, line 41 (claim 19) after "distance" delete "a lower end of said sliding block means,"

Signed and Sealed this
Fourth Day of October, 2011

David J. Kappos

David J. Kappos
*Director of the United States Patent and Trademark Office*